United States Patent Office 3,336,172
Patented Aug. 15, 1967

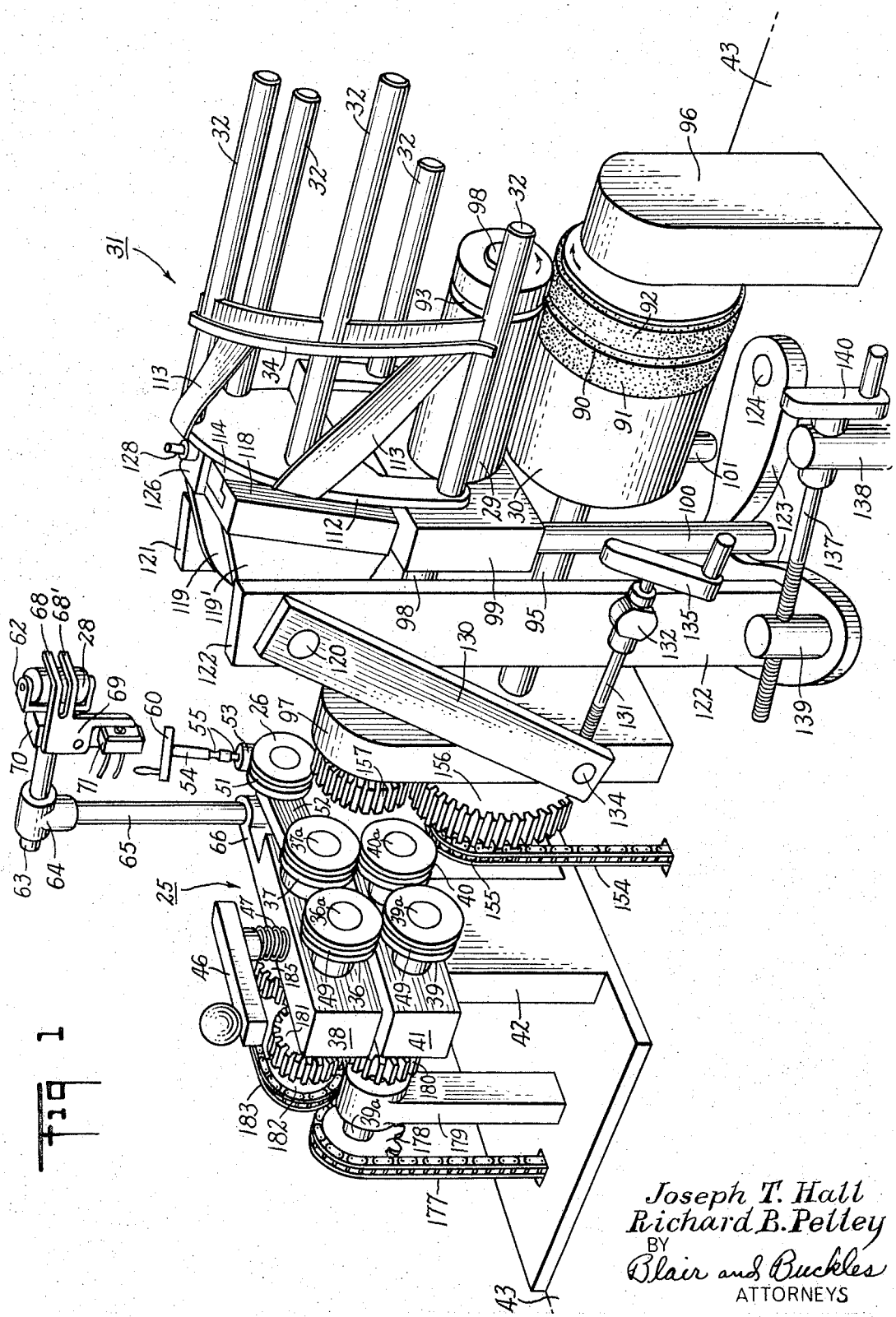

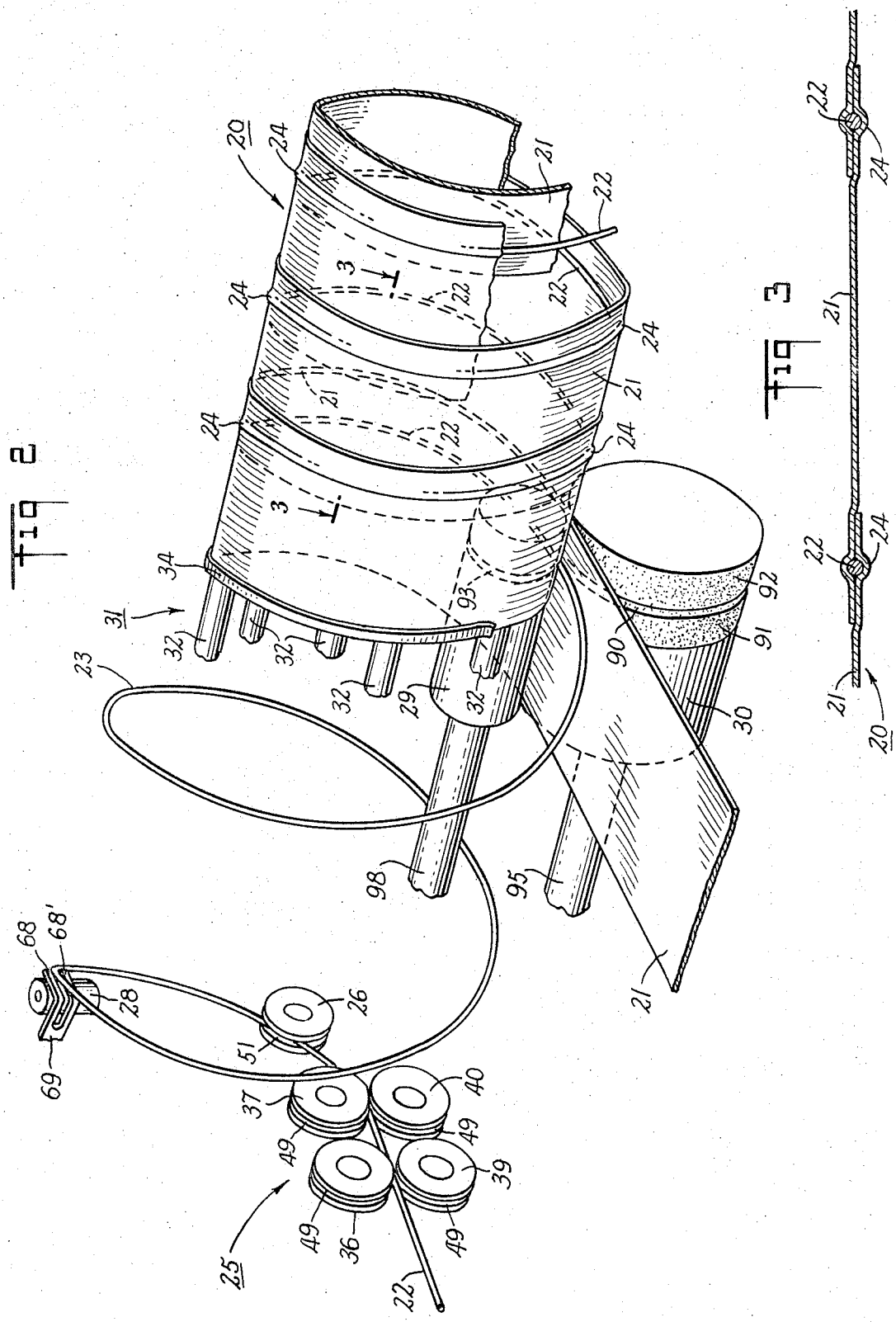

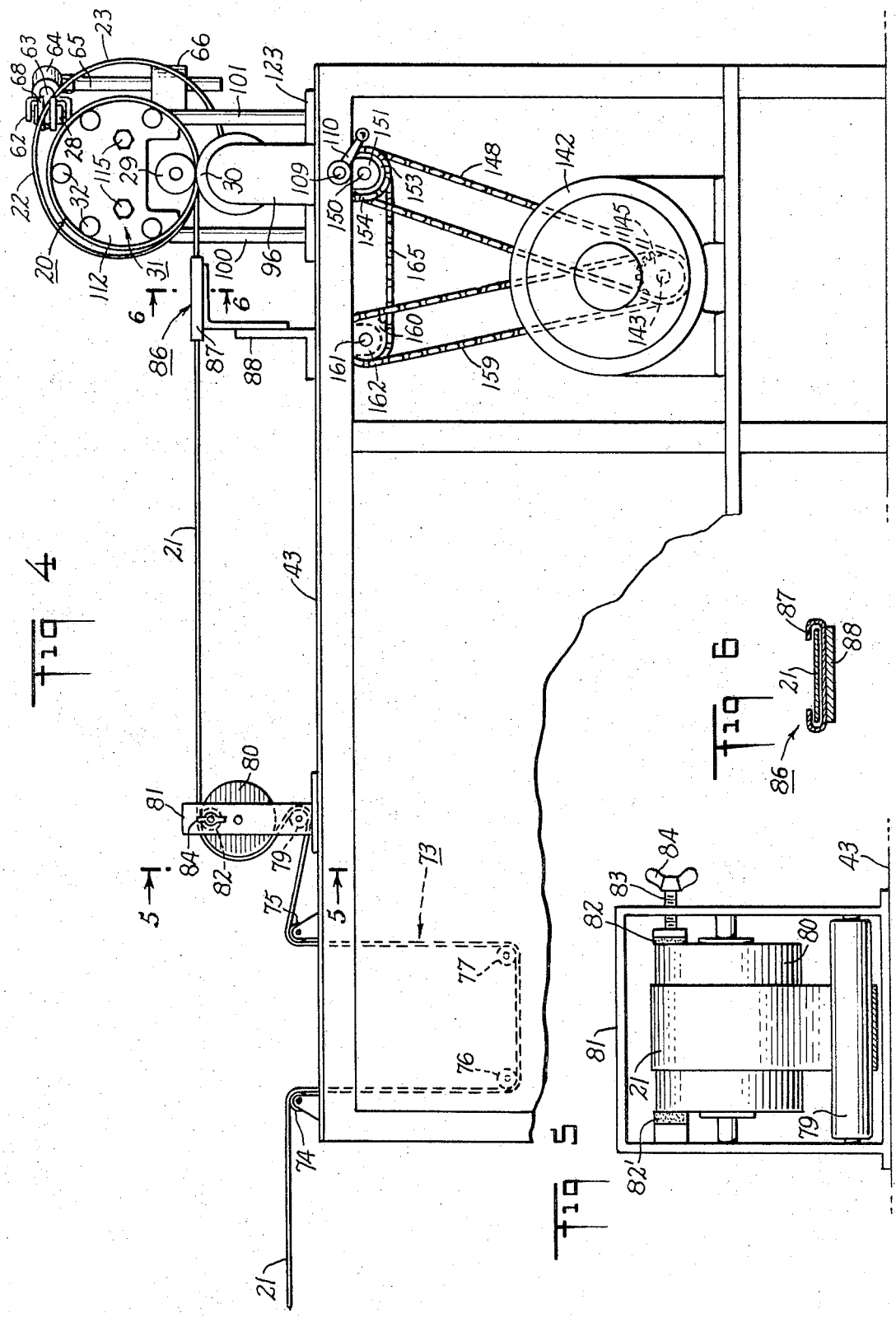

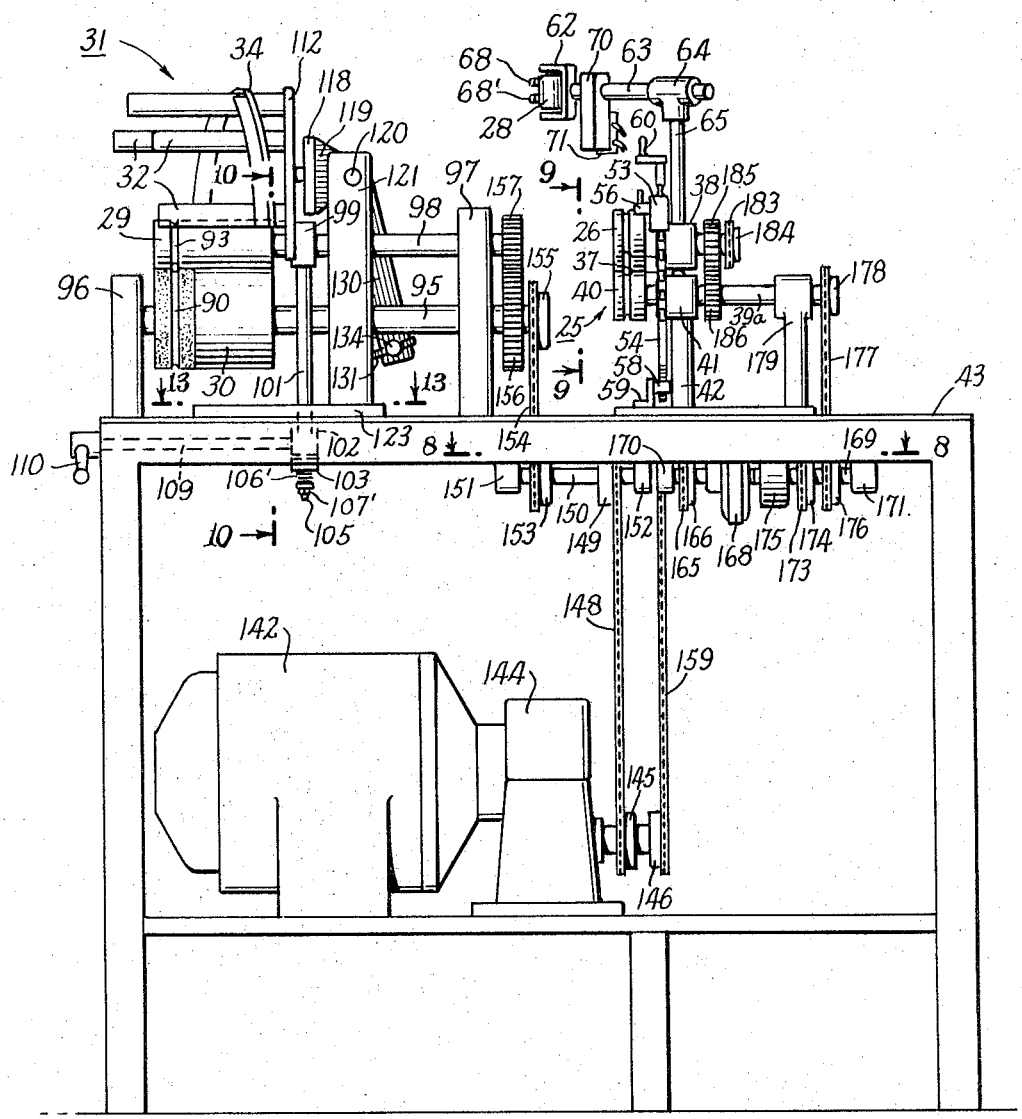

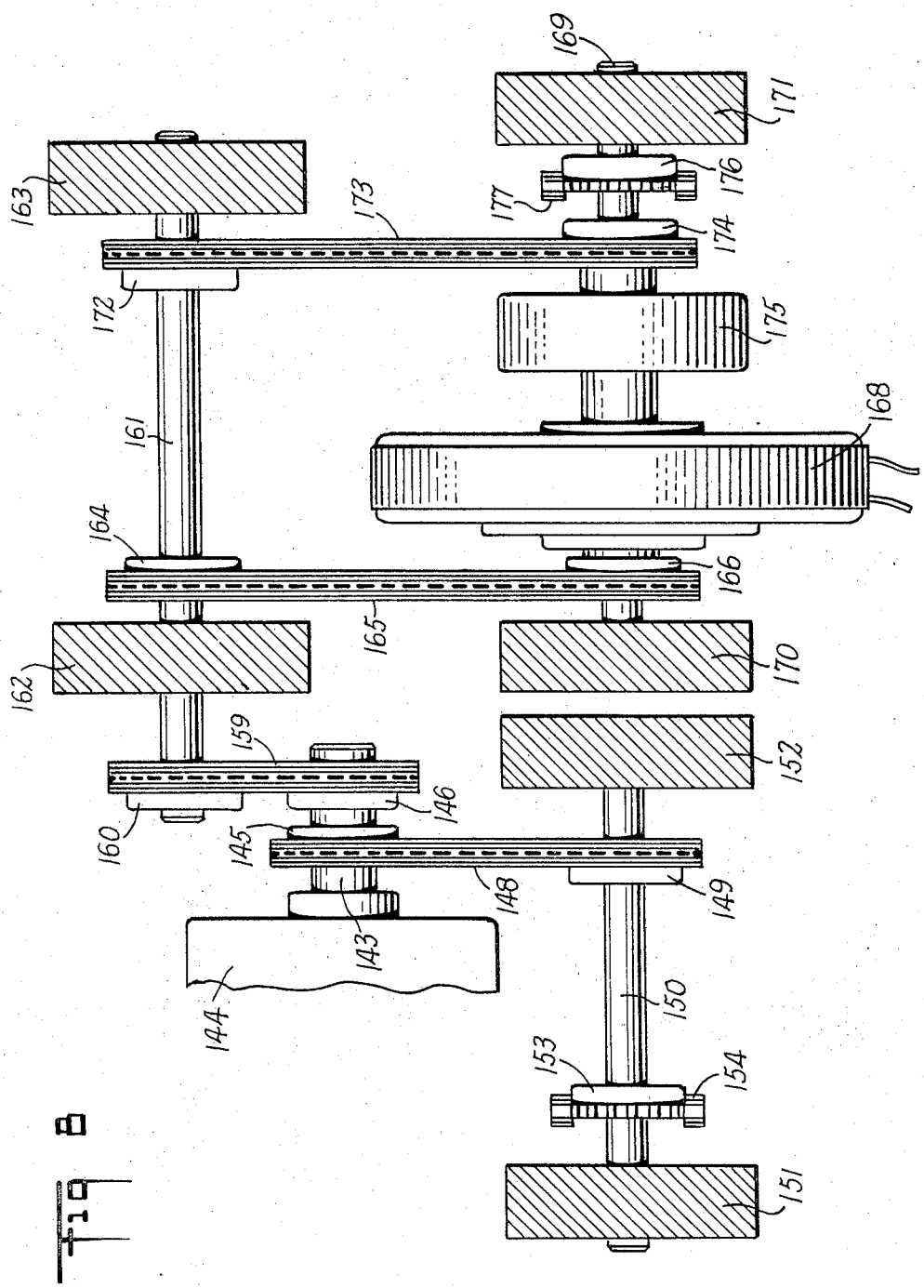

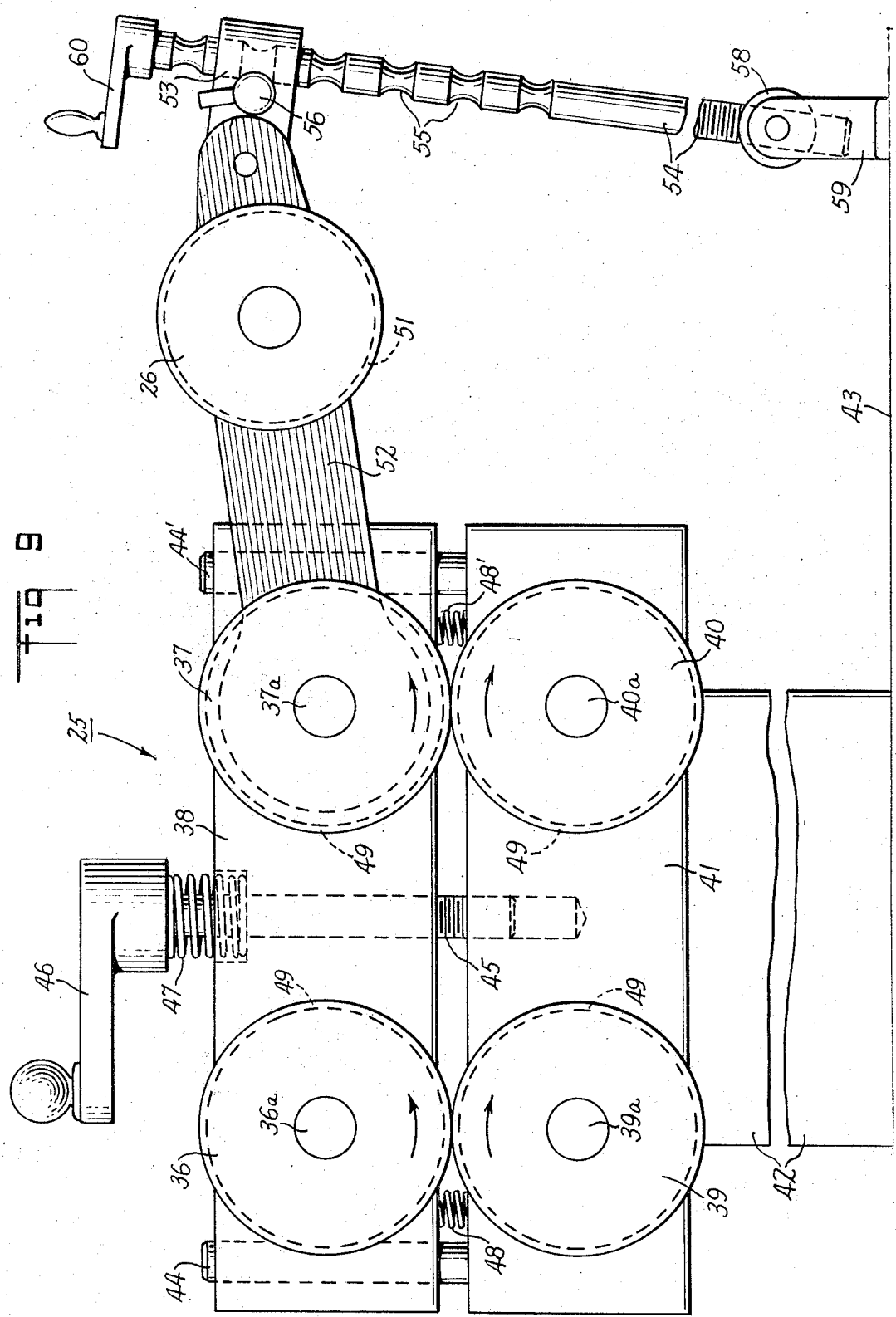

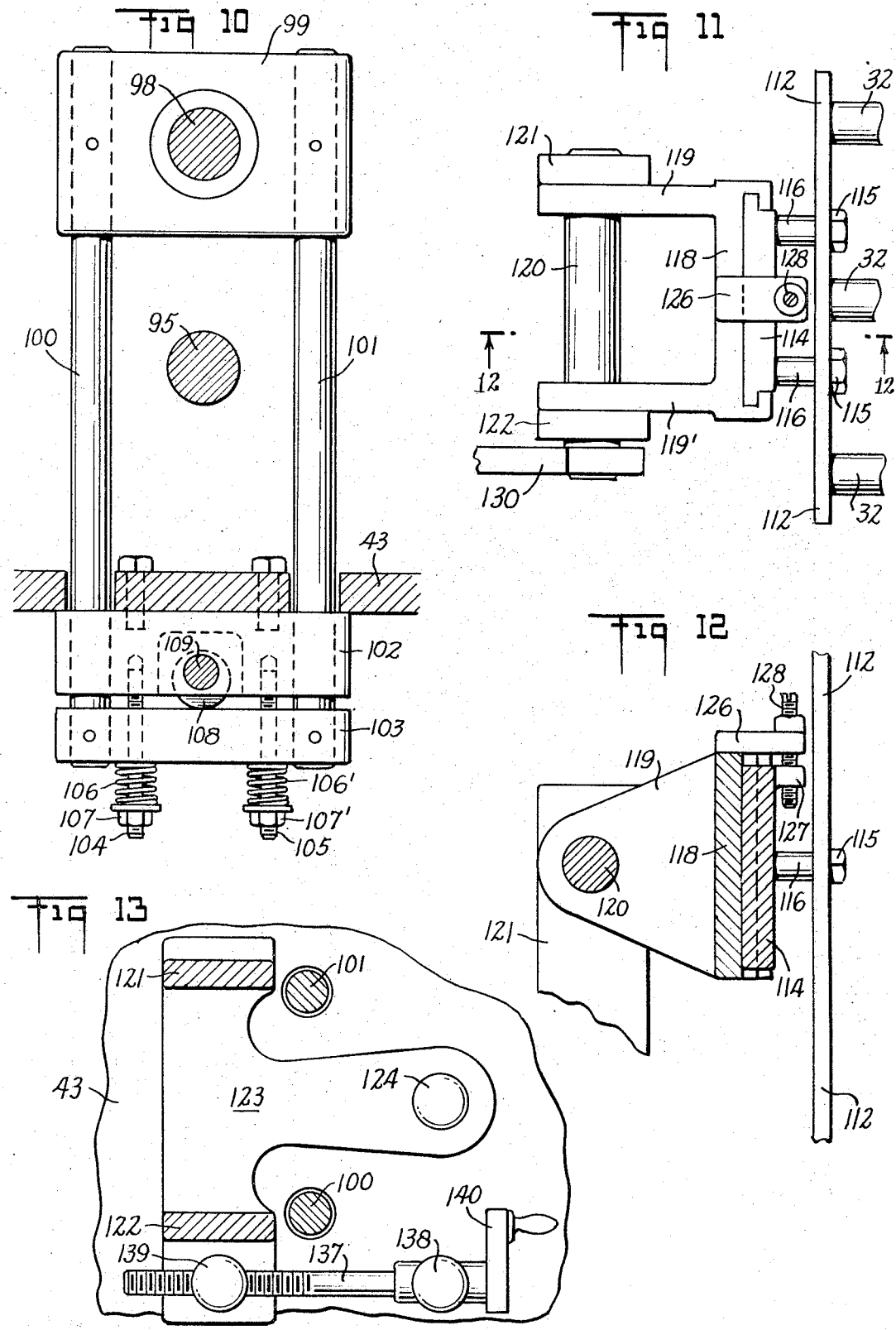

3,336,172
METHOD AND APPARATUS FOR CONTINUOUSLY FORMING A REINFORCED FLEXIBLE HOSE
Joseph T. Hall, Stamford, Conn., and Richard B. Pelley, East Kingston, N.H., assignors to Callahan Mining Corporation, New York, N.Y.
Filed Oct. 12, 1964, Ser. No. 403,210
13 Claims. (Cl. 156—143)

This invention relates to improvements in flexible hose, and further to the method and apparatus for continuously forming such hose from a continuous strip of adhesive tape by helically winding such tape in overlapping edge relation and by incorporating a continuous preformed helical wire reinforcement member in the hose construction between the overlapping edges of the helically wound tape.

Flexible hose of this general type is disclosed in Patent Nos. 2,486,387 and 2,674,296 to R. G. Bringolf, in Patent No. 2,759,521 to J. T. Hall et al., and in the application of L. E. Carpenter et al. entitled, "Method and Apparatus for Making Flexible Hose, and Flexible Hose," Ser. No. 354,525 filed Mar. 25, 1964 and assigned to the assignee of the present application. The instant application is directed to an improved hose construction and to improvements in the method and apparatus described and claimed in the above noted Carpenter et al. application.

In the prior art wire reinforced hose construction, where the reinforcing wire is not plastically pre-formed with an advanced pitch, it has been found that the hose has a tendency to contract in length. As a result, the end of the hose may creep back from its desired location. In an effort to overcome this the tape material used to form the hose has heretofore been made relatively stiff so as to maintain its length against the inherent tendency to contract. This stiffening of the hose, however, reduced its lateral flexibility and prevented it from being readily collapsed lengthwise for storage and shipping. One solution to this problem has been to preform the reinforcing wire into a helix of advanced pitch and then to apply fabric over the compressed wire helix, as suggested in Patent No. 2,452,047 of C. M. Hamblin. This proposal, however, generally required stitching tape seams together around the preformed wire helix, or using a separate seam joining strip, neither of which approach was adaptable to continuous wind high speed automatic manufacturing techniques.

The present invention provides means for continuously preforming a wire helix of any desired diameter, and any selected pitch, and continuously incorporating the preformed wire helix between overlapping edges of helically wound adhesive tape. The overlapping tape edges are bonded together to form a flexible hose. By preselecting the pitch of the preformed wire helix to be greater than the pitch of the wound tape, the hose formed thereby is biased in a longitudinal stretch condition to maintain its maximum length. Alternatively, by preselecting the pitch of the preformed wire helix to be substantially less than the tape pitch, the finished hose may be biased in a contracting mode to normally maintain the hose in axially collapsed condition. If it is desired to produce unstressed hose, the apparatus of the invention may be adjusted to preform the wire helix at the same pitch as that of the wound tape.

Accordingly it is an object of the invention to provide an improved flexible hose construction of superior ruggedness and durability.

A further object is to provide apparatus for the manufacture of such improved hose.

A still further object is to provide a method for the manufacture of such improved hose.

A more specific object is to provide apparatus for forming a wire reinforced hose by a "continuous wind" process wherein the reinforcing wire is continuously plastically preformed into a helix, and to incorporate this preformed wire helix into a continuously wound helix of adhesive tape whereby the resulting hose is constantly biased in a predetermined axial direction.

Another object of the invention is to provide apparatus of the above character which is capable of continuously forming a pre-stressed flexible hose at a faster rate than has heretofore been possible, thereby reducing the cost of hose manufacture.

A further object of the invention is to provide apparatus of the above character capable of producing more flexible hose of superior ruggedness and durability from a lesser quantity of tape than has heretofore been possible, thereby further reducing the cost of hose manufacture.

An additional object of the invention is to provide versatile apparatus of the above character capable of manufacturing continuous flexible hose of greater flexibility and greater resiliency than it has been possible to produce with apparatus of the prior art.

Other objects of the invention will in part be obvious and will in part appear hereinafter.

The invention accordingly comprises the several steps and the relation of one or more of such steps with respect to each of the others, the apparatus embodying features of construction, combinations and arrangement of parts which are adapted to effect such steps, and the article which possesses the characteristics, properties and relation of elements, all as exemplified in the detailed disclosure hereinafter set forth, and the scope of the invention will be indicated in the claims.

For a fuller understanding of the nature and objects of the invention, reference should be had to the following detailed description taken in connection with the accompanying drawings, in which:

FIGURE 1 is a perspective view of a hose forming apparatus constructed according to the invention;

FIGURE 2 is a fragmentary perspective view of the manner of forming a wire reinforced flexible hose according to the method of, and by the apparatus of, the present invention;

FIGURE 3 is a fragmentary sectional view of a wire reinforced flexible hose constructed according to the present invention;

FIGURE 4 is a front elevational view of the flexible hose forming apparatus of FIGURE 1;

FIGURE 5 is a side elevational view of a portion of the apparatus looking to the right along line 5–5 of FIGURE 4;

FIGURE 6 is a sectional view of a portion of the apparatus looking to the right along line 6–6 of FIGURE 4;

FIGURE 7 is an end elevational view of the hose forming apparatus of FIGURE 1;

FIGURE 8 is an enlarged longitudinal sectional view of a portion of the apparatus looking down along line 8–8 of FIGURE 7;

FIGURE 9 is an enlarged elevational view looking to the right along line 9–9 of FIGURE 7;

FIGURE 10 is an enlarged elevational sectional view looking to the right along line 10–10 of FIGURE 7;

FIGURE 11 is an enlarged plan view of a portion of the apparatus of FIGURE 7;

FIGURE 12 is a sectional view looking up along line 12–12 of FIGURE 11; and

FIGURE 13 is a longitudinal sectional view of a portion of the apparatus looking down along line 13—13 of FIGURE 7.

Similar reference characters refer to similar parts throughout the several views of the drawings.

Referring now to the drawings and particularly to FIGURES 2 and 3, the hose of the invention, generally indicated at 20, is formed from a helically wound flexible tape material 21, preferably preconditioned with an adhesive coating of a type such as disclosed in above indentified Patent No. 2,486,387. The character of the helical path taken by the tape 21 is such that the lateral edge portions of adjacent tape convolutions assume an overlapping relationship. A wire 22 of spring steel, plastically deformed into a helix as indicated at 23, is incorporated between the overlapping edges of the helically wound tape 21. The overlapping edge portions are bonded together with the wire 22 lodged therebetween to provide a seam, generally indicated at 24 in FIGURE 3, spiralling the entire length of the hose 20. The resulting elongated tubular structure provides a hose 20 which is flexible in the axial and lateral directions, and yet quite rigid in the radial direction due to the reinforcement provided by the wire 22 incorporated in the continuous seam 24.

The relationship between the preformed wire helix 23 and the helix of tape 21 may be varied to provide a hose 20 having different characteristics. The pitch of the wire helix 23 may be made greater than the pitch of the tape helix so as to provide a hose biased longitudinally to maintain its maximum length. It is also contemplated that the pitch of the wire helix could be made smaller than the pitch of the tape helix so as to provide a hose tending to longitudinally collapse. Moreover, the pitch of the wire helix could be made to equal that of the tape helix so as to provide an unstressed hose having a neutral, unbiased length.

In the continuous forming of the hose 20 described above by the method and apparatus of the invention, the reinforcing wire 22 is drawn from a supply roll (not shown) by two sets of driven rollers, generally indicated at 25 in FIGURE 2. The reinforcing wire 22 exiting from the bite of the rollers 25 is pushed against an idler roller 26. This idler roller 26 is adjustably positioned above the bite of the rollers 25. The section of reinforcing wire 22 between the bite of the rollers 25 and the point of contact with the idler roller 26 is plastically deformed to assume an arcuate path having a radius of curvature dependent upon the positioning of the idler roller 26 relative to the rollers 25.

The reinforcing wire 22 passes from the idler roller 26 into contact with an elevated idler roller 28 adjustably positioned above the idler roller 26 and out of the vertical plane containing the idler roller 26 and the rollers 25. The reinforcing wire 22, on encountering the elevated idler roller 28 is deflected out of its arcuate path and into a helical path. The section of wire 22 between the elevated idler roller 28 and the bite of the rollers 25 is twisted to the extent that it is plastically deformed into the helix 23.

The reinforcing wire 22, on leaving the bite of the rollers 25, is thus continuously plastically deformed from a straight wire into a wire helix 23 with the relative position of the idler roller 26 determining the radius and the relative position of the elevated idler roller 28 determining the pitch of the resulting wire helix.

Still referring to FIGURE 2, the flexible tape 21 is drawn from a tape supply (not shown) by a pair of hose forming rolls 29 and 30. The free end of the tape 21 is introduced into the nip of the upper forming roll 29 and the lower larger forming roll 30. The tape 21 leaving the nip of the hose forming rolls 29 and 30 is looped over a hose forming head, generally indicated at 31, and the tape end refed into the nip of the hose forming rolls. The hose forming head 31 includes a plurality of supporting rollers 32, mounted in circumferentially spaced relationship as best seen in FIGURE 1, to support this tape loop and thereby control the diameter of the finished hose in the manner taught in the above-noted Hall et al. Patent No. 2,759,521.

The hose forming head 31 further includes tape guide; generally indicated at 34, to steer this tape loop into a helical path such that, when the end of the tape 21 is refed into the nip of hose forming rolls 29 and 30, an edge overlapping relationship is achieved. Just prior to the achievement of this edge overlapping relationship, the end of the preformed wire helix 23 is introduced into the nip of the forming rolls 29 and 30 between the overlapping edges of the tape 21. The pressure of the forming rolls 29 and 30 bonds the overlapping edges of the tape 21 together with the wire 22 incorporated therebetween to create the continuous seam 24 shown in FIGURE 3.

Referring to FIGURES 1 and 9, the rollers 25 consist of a pair of upper rollers 36 and 37 mounted for rotation with drive shafts 36a and 37a, respectively, journalled in an upper bearing casing 38. A pair of lower rollers 39 and 40 are keyed to driveshafts 39a and 40a, respectively, journalled in a lower bearing casing 41. The lower bearing casing 41 is mounted on an upright bracket 42 affixed to a table 43.

As more clearly seen in FIGURE 9, the upper bearing casing 38 and lower bearing casing 41 are spring loaded so as to urge upper rollers 36 toward lower roller 39 and upper roller 37 toward lower roller 40. To achieve this end, a pair of legs 44 and 44' are affixed in the lower bearing casing 41 and slidably received through bores in the upper bearing casing 38. A shaft 45 passing vertically through a bore in the upper bearing casing is threaded into the lower bearing casing 41 by turning a crank 46 affixed to its upper end. A spring 47 slipped on the shaft 45 is compressed between the crank 46 and the top of the upper bearing casing 38 so as to urge the latter downwardly toward the lower bearing casing 41. This downward biasing is resisted by a pair of springs 48 and 48' compressed between the upper and lower bearing casings 38, 41.

The rollers 36 and 39 are counter-rotated, as are rollers 37 and 40, by driving means to be described, to draw the reinforcing wire 22 from a supply roll. The wire 22 passing between each upper and lower roller set is lodged in grooves 49 (FIGURE 1) formed in the surface of each roller to maintain the wire centered between the rollers and to increase the surface contact between the wire and the roller surfaces. The rollers 25 thus acquire a sure bite on the wire 22 so as to steadily draw the wire from the supply roll. To initially feed the wire 22 between these rollers, the crank 46 is turned to release the downward pressure of spring 47. Once the end of the wire 22 is fed between the rollers 25, the crank 46 is turned to compress the spring 47 until the desired bite on the wire 22 is achieved. By virtue of the spring loading of the rollers 25, jamming caused by surface irregularities and kinks in the wire 22 is largely eliminated.

Still referring to FIGURE 9, the idler roller 26, having an annular groove 51 (FIGURE 1) to center the wire 22, is rotatably mounted on a bracket 52. One end of the bracket 52 is journalled about the drive shaft 37a for roller 37 to pivot freely about the axis thereof. The other end of the bracket 52 is pivotally linked to a sleeve 53. The sleeve 53 is slipped on a rod 54 having a series of uniformly spaced annular grooves 55. A pin 56 inserted through the sleeve 53 locks the sleeve on the rod 54 relative to one of the grooves 55. The lower end of the rod 54 is threaded through a post 58 pivotally mounted by a bracket 59 affixed to the table 43. The rod 54, when rotated by a hand crank 60, turns freely in the sleeve 53 and advances into or out of post 58.

It will thus be seen that the pin 56 can be withdrawn and the upper end of the bracket 52 raised or lowered to produce the desired positioning of the roller 26. The sleeve 53 slides on the rod 54 to the one groove 55 which comes closest to giving the desired elevation of roller 26. Pin 56 is reinserted to lock the sleeve 53 on the rod 54 relative to the selected groove 55. The rod 55 is turned by the crank 60 for a fine adjustment of the positioning of the idler roller 26. As previously described, the position of the idler roller 26 determines the diameter of the wire helix 23.

Returning to FIGURE 1, the elevated idler roller 28 is mounted for rotation about a vertical axis by a bracket 62. The bracket 62 is affixed to the free end of an arm 63 slidably held in a sleeve 64. The sleeve 64 is held on the upper end of a standard 65 slidably and rotatably mounted in a bracket 66 affixed to the upper bearing casing 38. Elevation and azimuth positioning of the idler roller 28 is obtained by sliding and rotating the standard 65 in the bracket 66 and then locking it in position by suitable means, not shown. The length of the arm 63 may be adjusted by sliding it through the sleeve 64 to finally position the idler roller 28 relative to the rollers 25 and thereby determine the pitch of the wire helix 23 as previously described. It will thus be seen that the idler rollers 26 and 28 are readily positionable to produce a preformed wire helix 23 having the desired dimensional characteristics.

The reinforcing wire 22, in contacting the idler roller 28, passes between the forked ends 68, 68' of a switch operating member 69 (FIGURE 2) pivoted to a block 70 affixed to the arm 63. The member 69 pivots in response to variations in the diameter of the wire helix 23 to selectively operate a microswitch 71 also mounted on the block 70. The microswitch selectively controls the drive in a manner to be described so as to coordinate the speeds of the rollers 25 and the forming rolls 29 and 30.

Referring now to FIGURE 4, the tape 21, drawn from a supply roll (not shown), is suitably conditioned by the application of an adhesive coating to both sides of the tape. The tape 21 is fed through a tracking mechanism, generally indicated at 73. The tracking mechanism 73 consists of a pair of spaced upper rollers 74 and 75 mounted above the table 43 and a pair of lower rollers 76 and 77 mounted beneath the table. The upper and lower rollers 75, 77 may be laterally offset from upper and lower rollers 74, 76 so as to provide any lateral adjustment necessary to compensate for misalignment of the point of tape output from the supply and the point of tape input to the hose forming apparatus.

The tape 21, after passing over the upper roller 75, is wrapped around an idler roller 79 and over a tension drum 80. The idler roller 79 and the tension drum 80 are rotatively mounted by a bracket 81 affixed to the table 43. As seen in FIGURE 5, a brake shoe 82, mounted on the end of a shaft 83 threaded through the side of the bracket 81, bears against the end of the tension drum 80. A fixed brake shoe 82' bears against the opposite end of the drum 80. A wing head 84 formed on the free end of the shaft 83 facilitates turning of the shaft to adjust the brake pressure against the drum 80. With the rotation of the drum 80 resisted by the action of the brake shoe 82, 82', the desired tensioning of the tape 21 is achieved as it is drawn by the hose forming rolls 29 and 30.

A tape guide, generally indicated at 86, serves to properly guide the tape 21 into the nip of the hose forming rolls 29 and 30. The tape guide is formed by a channel 87, best seen in FIGURE 6, mounted by a bracket 88 affixed to the table 43.

Returning again to FIGURE 1, the lower hose forming roll 30 is formed with a circular groove 90 and is recessed on each side of the groove to receive annular rubber inserts 91 and 92 which extend slightly beyond the surface of the roll. The upper forming roll 29 is also formed with a circular groove 93 vertically aligned with the groove 90 in the lower forming roll 30. With the upper and lower forming rolls 29, 30 urged toward peripheral contact, the wire 22 is accommodated in the grooves 90, 93 while the rubber inserts 91, 92 deform to provide greater roll surface contact at the nip for firmly bonding the overlapping edges of the tape 21 together in forming the hose 20.

As also seen in FIGURE 7, the lower forming roll 30 is keyed to a drive shaft 95 journalled in spaced bearing housings 96 and 97 mounted on the table 43. The upper forming roll 29 is keyed to a second drive shaft 98 rotatively mounted at a point inwardly of the roll by a movable bearing housing 99. The inner end of the drive shaft 98 is mounted in the bearing housing 97. The outer end of the shaft 98 is unsupported in order that the hose 20 may feed axially outward from the nip of the upper and lower forming rolls 29, 30 as seen in FIGURE 2.

The movable bearing housing 99 rotatively mounting the drive shaft 98, as more clearly seen in FIGURE 10, is supported on the upper ends of a pair of spaced legs 100 and 101. The lower ends of the legs 100 and 101 pass through the table 43 and through bores in a mounting block 102 bolted beneath the table. A common bridging member 103 is affixed to the lower ends of the legs 100 and 101 which project through the mounting block 102. A pair of stud bolts 104 and 105 passing freely through bores in the bridging member 103 are threaded into the mounting block 102. The lower ends of the spaced stud bolts 104 and 105 receive springs 106, 106' which are compressed by nuts 107, 107' threaded on the ends of the stud bolts. Compression of the springs 106 and 106' urges the bridging member 103 together with the legs 100 and 101 upwardly. This movement is prevented by an eccentric 108 keyed to a shaft 109 mounted beneath the table 43.

As seen in FIGURES 4 and 7, the end of the shaft 109 is keyed to a crank 110 which is manipulated to rotate the eccentric 108 thereby permitting the springs 106, 106' to urge the bearing housing 99 upward. This rocks the shaft 98 slightly upwardly to lift the upper forming roll 29 away from the lower forming roll 30. While the forming rolls 29, 30 are separated the end of the tape 21 is readily introduced between the forming rolls, looped over the forming head 31 and refed along with the end of the wire helix 23 between the hose forming rolls. Once this is accomplished, the crank 110 is turned to rotate the eccentric 108 forcing the bearing housing 99 downward and moving the upper forming roll 29 toward the lower forming roll 30. Once this is accomplished, the apparatus is prepared to begin forming the hose 20.

Referring to FIGURE 1, the rollers 32, supporting the tape 21 as it is looped back and refed into the nip of forming rolls 29 and 30, are cantilever mounted in circumferentially spaced relationship by a face plate 112. The tape guide 34, disposed over the rollers 32 to steer the tape 21 into a helical path, is supported by spaced brackets 113 affixed to the face plate 112. The face plate 112 is removably affixed to a flanged block 114 by bolts 115, as best seen in FIGURE 11. Spacing sleeves 116, serve to space the face plate 112 from the flanged block 114. The flanged block 114 is slidably received in a channel 118. A pair of arms 119, 119', affixed to the channel 118, pivot with the rotation of a horizontal shaft 120. The shaft 120 is rotatably mounted by a pair of standards 121, 122 affixed to a base plate 123 lying on the upper surface of the table 43 and pivoting about a pin 124, as seen in FIGURES 1 and 13.

Referring to FIGURE 12, an upper ear 126 affixed to the top of the channel 118 is vertically aligned with lower ear 127 affixed to the flanged block 114. A shaft 128 collared to the upper ear 126 is threaded through the lower ear 127. Rotation of the shaft 128 slidably positions and holds the flanged block 114 in the channel 118 to provide a fine vertical position adjustment of the forming head 31 relative to the nip of the forming rolls 29 and 30.

Referring again to FIGURE 1, a crank arm 130 is keyed to the horizontal shaft 120. A shaft 131 rotatably mounted by a collar 132 attached to the standard 122 is threaded through a post (not shown) pivoted at 134 to the lower end of the crank arm 130. A hand crank 135 affixed to the end of the shaft 131 is rotated to pivot the crank arm 130 which, in turn, rotates the shaft 120. It will thus be seen that the forming head 31 swings vertically to adjustably position it relative to the nip of the hose forming rolls 29, 30.

A second shaft 137 is rotatively mounted in a post 138 pivotally mounted to the table 43. The thread end of the shaft 137 is threaded through a post 139 pivotally mounted to the base plate 123. The other end of the shaft 137 receives a crank 140 used to turn the shaft so as to pivot the base plate 123 about the pin 124. This, in turn, swings the forming head 31 horizontally into the desired position.

It will thus be seen that the hose forming head 31 is readily pivotable about the horizontal axis of the shaft 120 and the vertical axis of the pin 124 so as to substantially properly orient the rollers 32 and the tape guide 34 relative to the hose forming rolls 29, 30 for the desired pitch of the helically wound hose 10. Turning of the shaft 128 then provides a fine position adjustment of the hose forming head 31. The hose forming head 31 can be readily unbolted from the flanged block 114 and replaced with another hose forming head when it is desired to make hose of a different diameter.

As seen in FIGURE 7, a motor 142, suitably mounted beneath the table 43, is coupled to an output shaft 143 through a suitable reduction unit 144. Referring now to FIGURE 8, a pair of drive sprockets 145 and 146 are keyed to the output shaft 143. The sprocket 145 drives a chain 148 which runs upwardly, as best seen in FIGURE 4, to where it engages a sprocket 149 keyed to a first jack shaft 150. The jack shaft 150 is journalled at its ends in a pair of bearings 151 and 152 mounted beneath the table 43. A sprocket 153 keyed to the jack shaft 150 drives a second chain 154 which is brought up through the top of the table 43 to engage a sprocket 155 (FIGURES 1 and 7) keyed to the shaft 95 of the lower forming roll 30. A pinion 156 keyed to the shaft 95 engages a second smaller pinion 157 keyed to the end of the shaft 98 of the upper forming roller 29. In this manner, the forming rolls 29 and 30 are driven in counter-rotating fashion to draw the tape 21 and the wire 22 through their nip in forming the hose 20 as previously described.

Still referring to FIGURE 8, the second drive sprocket 146 drives a chain 159 which runs upwardly (FIGURE 4) to where it engages a sprocket 160 keyed to a second jack shaft 161. Jack shaft 161 is rotatably mounted beneath the table 43 in space bearings 162 and 163. A sprocket 164, keyed to the jack shaft 161, engages a chain 165 to drive a sprocket 166 which is coupled through a magnetic clutch 168 to a shaft 169. Shaft 169 is journalled in spaced bearings 170 and 171 mounted beneath table 43. Another sprocket 172 keyed to the jack shaft 161 engages a chain 173 to drive a sprocket 174 coupled to the shaft 169 through an over-riding clutch 175. The over-riding clutch 175 may be of the type manufactured by the Formsprag Company of Warren, Michigan.

A sprocket 176 keyed to the shaft 169 engages a chain 177 which is brought up through the table 43 to drive a sprocket 178 as seen in FIGURE 1. Sprocket 178 is keyed to the shaft 39a journalled in an upright bearing housing 179 for driving the roller 39. A pinion 180 keyed to shaft 39a engages a pinion 181 keyed to the shaft 36a of roller 36 to counter-rotate rollers 36 and 39. A sprocket 182 keyed to the end of the shaft 36a engages a chain 183 to drive a sprocket 184 (FIGURE 7) keyed to the shaft 37a for the upper roller 37. As best seen in FIGURES 1 and 7, the shaft 37a mounts a pinion 185 which drives a pinion 186 keyed to the shaft 40a of the lower roller 40. In this manner, the rollers 37 and 40 are also driven in counter-rotational fashion.

The drives for the hose forming rolls 29, 30 and the rollers 25 must be coordinated so that the rate at which the preformed wire helix 23 is fed to the forming rolls substantially equals the rate of formation of the hose 20. It is found to be particularly troublesome to achieve a predetermined relationship between the two drives because of the stretchable characteristics of the tape 21 and the unstretchable characteristics of the wire 22. In order to achieve continued coordination of the two drives, the sprockets 172 and 174, as seen in FIGURE 8, are chosen so as to drive the rollers 25, feeding the wire 22, through the over-riding clutch 175 at a rate which is less than the rate at which the hose forming rollers 29, 30 are driven. For example, the rollers 25 may be driven through the over-riding clutch 175 at a rate 5% less than the driving rate of the hose forming rolls 29, 30. Sprockets 164 and 166, on the other hand, are chosen so as to drive the rollers 25 through the magnetic clutch 168 at a greater rate, such as 5% greater, than the constant driving rate of the hose forming rolls 29, 30. The choice of whether to drive the rollers 25 through the over-riding clutch 175 or the magnetic clutch 168 is made by the microswitch 71 shown in FIGURE 1.

As will be seen from FIGURE 2, if the rollers 25 are being driven through the over-riding clutch 175, the hose forming rolls 29, 30 will be using up the wire 22 at a faster rate than it is being supplied by the rollers 25. As a consequence the wire helix 23 between the rollers 25 and the hose forming rolls 29, 30 will be extended thereby causing a decrease in the helix diameter. This reduction in helix diameter is sensed by the switch operating member 69 which is pivoted downwardly by the wire 22 passing between its forked ends 68, 68'. This downward pivoting of the switch operating member 69 closes the microswitch 71 to energize the magnetic clutch 168. The magnetic clutch 168 engages to connect the drive of the sprockets 164 and 166 to the rollers 25. With the shaft 169 now being driven at a 10% faster rate, the clutch 175 is over-ridden thereby disengaging the drive sprocket 174 from the shaft 169. Since the wire 22 is now being supplied at a faster rate than it is being used up by the forming rolls 29, 30, the wire helix 23 will be effectively compressed. The resulting increase in the helix diameter will pivot the switch operating member 69 upwardly to eventually open the microswitch 71 and de-energize the magnetic clutch 168. With the sprocket 166 now disengaged, the over-riding clutch 175 will engage the sprocket 174 to the shaft 169, when the shaft rotational velocity slows to that of the sprocket 174.

It will thus be seen that the drive of the rollers 25 alternates through the over-riding clutch 175 and the magnetic clutch 168 to continuously maintain the feed rate of the wire 22 to the hose forming rolls 29, 30 between satisfactory limits.

The flexible hose constructed according to the present invention is found to be of high durability and ruggedness, and fluid tight. Since the wire 22 is not incorporated in a folded back edge of the tape 21, as in some prior art hose constructions, a saving in tape is obtained. Moreover, greater lap strength is achieved since the tape edges are overlapped and bonded together on both sides of the wire 22 in forming the seam 24. As a result, the seam 24 is less likely to separate on being subjected to sharp blows at points adjacent the wire 22. Furthermore, since the reinforcing wire 22 is incorporated between tape edges which are simply overlapped, a substantially smoother inner and outer hose surface is obtained, thus offering little resistance to the passage of gases through the hose. It is also found that the reinforcing wire 22 can be severed at a point close to the end of the hose 20 and the loose end of the wire readily pulled out without destroying the seam 24. This leaves an unreinforced hose end portion to which a cutff or coupling can be more readily attached.

By the method and apparatus of the present invention, the flexible hose 20, having the above-noted characteristics, can be formed in "continuous wind" fashion at production line speeds. The hose forming apparatus is readily adapted to forming hose of different diameters by the simple substitution of the appropriate hose forming head 31 having rollers 32 circumferentially arranged according to the desired hose diameter. The forming head 31 is readily oriented to position the tape guide 34 so as to give the desired pitch to the helically wound tape 21. Since the hose forming rolls 29, 30 are provided with single coacting grooves 90, 93, they do not have to be changed when the pitch of the helically wound tape is changed.

The idler rollers 26 and 28 are also readily positioned to plastically preform the wire helix 23 such that when the wire 22 is incorporated in the finished hose it will have the desired characteristics. With the pitch of the wire helix 23 greater than that of the helically wound tape 21, the wire helix, when incorporated between the overlapping tape edges, is elastically compressed in the direction of its length. In this condition, the wire 22 continuously resiliently biases the finished hose to its full length. Thus the flexible hose, while it may be readily compressed axially for storage and shipping, normally extends itself to its full length and exhibits no tendency to contract or shorten in use.

A normally collapsible hose may also be formed by the method and apparatus of the invention. To achieve this, the preformed wire helix 23 is given a permanent pitch which is less than that of the helically wound tape 21. Thus, when incorporated between overlapping tape edges, the wire helix is elastically extended in length and will resiliently urge the completed hose to axially compress or contract itself. In use the hose may be readily extended to its full length. An unstressed hose may be formed by making the pitch of the wire helix equal to that of the helically wound tape. The completed hose would then exhibit no tendency to extend or contract its length.

It will thus be seen that the objects set forth above, among those made apparent from the preceding description, are efficiently attained and, since certain changes may be made in carrying out the above process, in the described product, and in the constructions set forth without departing from the scope of the invention, it is intended that all matter contained in the above description and shown in the accompanying drawings shall be interpreted as illustrative and not in a limiting sense.

Having described our invention what we claim as new and desire to secure by Letters Patent is:

1. An apparatus for continuously forming a reinforced flexible hose from a continuous flexible tape and a continuous spring wire, including hose forming rolls for spirally wrapping said tape with the lateral edges thereof in overlapping relation, deforming means for continuously plastically deforming said wire into a helical configuration and means incorporating said plastically deformed wire between said overlapped lateral edges of said tape, the improvement comprising in combination:
   (A) first drive means for driving said hose forming rolls at a substantially constant speed;
   (B) second drive means for feeding said wire through said deforming means, said second drive means
      (1) acting through a first clutch means to feed said wire at a speed slightly less than the speed of said hose forming rolls, and
      (2) acting through a second clutch means to feed said wire at a speed slightly in excess of the speed of said hose forming rolls; and
   (C) sensing means responsive to variations in the helical configuration of said deformed wire to cause said second drive means to selectively act through said first and second clutch means to substantially coordinate the speed of said second drive means to the speed of said hose forming rolls.

2. The apparatus defined in claim 1 wherein said hose forming rolls are provided with single coacting grooves to accommodate the incorporation of said wire between said overlapped lateral edges of said tape.

3. The apparatus defined in claim 2 including rubber inserts mounted on at least one said hose forming roll on each side of said groove so as to provide increased surface to surface contact between said hose forming rolls and said overlapping tape edges.

4. An apparatus for continuously forming a reinforced flexible hose from a continuous flexible tape and a continuous spring wire, said apparatus comprising, in combination:
   (A) deforming means for continuously plastically deforming the wire into a first helical path;
   (B) hose forming rolls;
   (C) forming head means cooperating with said forming rolls
      (1) to move said flexible tape over a second helical path, and
      (2) to overlap adjacent lateral edges of said tape;
   (D) means incorporating said deformed wire between said overlapping edges of said tape;
   (E) first drive means for driving said hose forming rolls at a substantially constant speed;
   (F) second drive means for feeding said wire through said deforming means, said second drive means
      (1) acting through a first clutch to feed said wire at a speed slightly less than the speed of said hose forming rolls, and
      (2) acting through a second cluch to feed said wire at a speed slightly in excess of the speed of said hose forming rolls; and
   (G) sensing means responsive to variations in the diameter of the helical path of said wire to cause said second drive means to selectively act through said first and second clutches to substantially coordinate the speed of said second drive means to the speed of said hose forming rolls.

5. An apparatus as defined in claim 4 wherein said forming head means is horizontally and vertically adjustable with respect to the axis of said hose forming rolls to vary the pitch of the helical path of said flexible tape, and including tape guide means for steering said tape into said second helical path to overlap adjacent lateral edges thereof.

6. An apparatus defined in claim 4 wherein the pitch of said first helical path is substantially equal to the pitch of said second helical path.

7. The apparatus defined in claim 4 wherein the pitch of said first helical path is greater than the pitch of said second helical path.

8. The apparatus defined in claim 4 wherein the pitch of said first helical path is less than the pitch of said second helical path.

9. An apparatus for continuously forming a reinforced flexible hose from a continuous flexible tape and a continuous spring wire, said apparatus comprising, in combination:
   (A) means for continuously plastically deforming the wire into a first helical path, said means including
      (1) a coacting pair of spring loaded rollers drawing said wire along a substantially straight line path from a supply,
      (2) plastic deformation means adjustably mounted relative to said rollers to bend said wire into an arcuate path, and
      (3) deflection means adjustably mounted laterally of said arcuate path and engaging said wire to twist it out of said arcuate path into said first helical path;
   (B) a pair of coacting hose forming rolls mounted axially of said first helical path, said hose forming rolls
      (1) operating to draw said tape from a supply;
   (C) a forming head cooperating with said forming rolls to define a second helical path for said tape, said forming head including
      (1) a plurality of supporting rollers cantilever mounted in circumferentially spaced relationship corresponding to the diameter of said second helical path,
      (2) tape guide means disposed over said supporting rollers to steer said tape into said second helical path and to overlap adjacent edges of said tape between said forming rolls,
   (a) said forming head being horizontally and vertically adjustable with respect to the axis of said hose forming rolls to vary the pitch of the helical path of said flexible tape;
(D) means incorporating said plastically deformed wire between overlapping edges of said strip at the intersection of said first and second helical paths between said forming rolls;
(E) drive means including
   (1) a motor,
   (2) means coupling said motor to drive said forming rolls at a selected rate,
   (3) an over-riding clutch normally engaging said motor to drive said coacting spring loaded rollers at a rate somewhat less than the rate of said forming rolls, and
   (4) a magnetic clutch engaging said motor to over-ride said over-riding clutch and drive said coacting spring loaded rollers at a rate somewhat greater than the rate of said forming rolls; and
(F) drive control means including
   (1) a microswitch operating to selectively engage said magnetic clutch, and
   (2) a switch actuator mounted adjacent said deflection means,
      (a) said actuator being responsive to variations in the helical path of said wire to operate said switch so as to coordinate the drive rate of said coacting spring loaded rollers to the drive rate of said forming rolls.

10. The method of continuously forming a reinforced flexible hose from a flexible tape and a spring wire, said method comprising the steps of:
(A) continuously drawing the wire from a supply source;
(B) plastically deforming said wire into a first helical path;
(C) continuously drawing the flexible tape from a supply source;
(D) guiding said tape into a second helical path to dispose lateral edges of said tape in overlapping relationship;
(E) continually coordinating the rate of drawing of said wire with the rate of drawing of said tape by sensing the variation in the diameter of the helical path of said wire and adjusting the rate of drawing thereof to compensate for said variation;
(F) incorporating said wire between overlapping edges of said tape at the intersection of said first and second helical paths; and
(G) immediately thereafter continuously bonding said overlapping edges of said tape together with said wire confined therebetween to form said hose.

11. The method defined in claim 10 wherein the pitch of said first helical path is substantially equal to the pitch of said second helical path.

12. The method defined in claim 10 wherein the pitch of said first helical path is greater than the pitch of said second helical path.

13. The method defined in claim 10 wherein the pitch of said first helical path is less than the pitch of said second helical path.

References Cited
UNITED STATES PATENTS

| | | | |
|---|---|---|---|
| 2,539,853 | 1/1951 | Meyers et al. | 156—143 |
| 2,759,521 | 8/1956 | Hall et al. | 156—429 |
| 2,874,723 | 2/1959 | Kahn | 156—195 X |
| 3,192,088 | 6/1965 | Lariviere | 156—195 X |

EARL M. BERGERT, *Primary Examiner.*

PHILLIP DIER, *Examiner.*